(12) United States Patent
Sako

(10) Patent No.: US 12,533,837 B2
(45) Date of Patent: Jan. 27, 2026

(54) PRESSURE MEASUREMENT DEVICE AND INJECTION MOLDING MACHINE

(71) Applicant: Sodick Co., Ltd., Kanagawa (JP)

(72) Inventor: Takumi Sako, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 205 days.

(21) Appl. No.: 18/470,393

(22) Filed: Sep. 19, 2023

(65) Prior Publication Data

US 2024/0123666 A1    Apr. 18, 2024

(30) Foreign Application Priority Data

Oct. 11, 2022 (JP) ................................. 2022-163288

(51) Int. Cl.
*B29C 45/77*    (2006.01)
*B29C 45/27*    (2006.01)

(52) U.S. Cl.
CPC .......... *B29C 45/77* (2013.01); *B29C 45/2701* (2013.01); *B29C 2045/2722* (2013.01); *B29C 2945/76006* (2013.01); *B29C 2945/7618* (2013.01); *B29C 2945/76381* (2013.01)

(58) Field of Classification Search
None
See application file for complete search history.

(56) References Cited

U.S. PATENT DOCUMENTS

| 2001/0013248 A1 | 8/2001 | Collin et al. |
| 2013/0255371 A1* | 10/2013 | Beaumont ............... B29C 45/77 73/196 |
| 2015/0084221 A1 | 3/2015 | Oomori |

FOREIGN PATENT DOCUMENTS

| FR | 2686695 | 7/1993 |
| JP | 2002527741 | 8/2002 |

* cited by examiner

*Primary Examiner* — Abbas Rashid
*Assistant Examiner* — Gregory C. Grosso
(74) *Attorney, Agent, or Firm* — JCIPRNET

(57) ABSTRACT

A pressure measurement device mountable to an injection unit that injects molding material of an injection molding machine, and an injection molding machine are provided. The pressure measurement device includes: a measurement cylinder mounted to the injection unit and through which the molding material injected by the injection unit flows; a plurality of dies mounted to the measurement cylinder and through which the molding material flows, and having different specifications; a flow path switching pin that selectively switches a discharge destination of the molding material to any one of the plurality of dies; and a pressure sensor that measures a pressure of the molding material in the measurement cylinder.

6 Claims, 10 Drawing Sheets

PRESSURE MEASUREMENT DEVICE AND INJECTION MOLDING MACHINE

CROSS-REFERENCE TO RELATED APPLICATION

This application claims the priority benefits of Japanese application no. 2022-163288, filed on Oct. 11, 2022. The entirety of the above-mentioned patent application is hereby incorporated by reference herein and made a part of this specification.

BACKGROUND

Technical Field

The disclosure relates to a pressure measurement device that is mountable to an injection unit that injects molding material of an injection molding machine, and an injection molding machine to which the pressure measurement device is mounted.

Related Art

When performing injection molding, there is a demand to grasp the melt viscosity of the molding material. For example, knowing the melt viscosity may serve as a reference for deriving molding conditions. In particular, for materials such as biodegradable plastic materials and compound materials to which nanofibers, metal powders, ceramics powders, etc., are added, there is often little knowledge about melting characteristics and flow characteristics, so knowing the melt viscosity is useful. Alternatively, measuring the melt viscosity can also be useful for quality control. For example, when virgin material and recycled material are mixed and used as molding material, it is possible to estimate the degree of deterioration of the molding material by checking the melt viscosity.

One of the devices for measuring the melt viscosity of a molding material is a capillary rheometer. The capillary rheometer is a device equipped with a cylinder, a die with a pore mounted at the cylinder outlet, and a pressure sensor for measuring the internal pressure of the cylinder. The capillary rheometer measures the viscosity of a sample by pushing out the sample filled into a cylinder with a piston, and measuring the internal pressure of the cylinder at this time. In this specification, unless otherwise specified, a die with a cylindrical cross-sectional pore is referred to as a capillary die, and a die with a rectangular cross-sectional pore is referred to as a slit die.

General viscosity measuring devices including capillary rheometers are relatively expensive and cannot be said to be widely spread among users of injection molding machines. Also, it requires work such as manually filling the cylinder with molding material as a sample, which makes measurement laborious. Thus, it is conceivable to measure the melt viscosity by a simpler mechanism using the device of an injection molding machine. For example, Patent Literature 1 discloses an injection molding machine that calculates melt viscosity by providing a pressure sensor in a nozzle adapter to which a nozzle is mounted and measuring resin pressure. The injection molding machine of Patent Literature 1 performs measurements similar to those of a capillary rheometer by using the nozzle as a capillary die. Using an injection molding machine has the advantage that measurements may be made under conditions close to actual injection molding.

CITATION LIST

Patent Literature

[Patent Literature 1] US 2015084221 A1

SUMMARY

Technical Problem

In order to perform pressure measurement for viscosity measurement, there may be cases where the die is replaced with one of different specifications. For example, when performing Bagley correction which takes into account the pressure loss occurred at a pore entrance and pore exit of the die so as to obtain a true shear stress, it is necessary to use two or more dies with different effective lengths of pores and measure the pressure during use of each die. In the injection molding machine of Patent Literature 1, if Bagley correction is to be performed, the nozzle used as a capillary die must be replaced during measurement.

The disclosure has been made in view of such circumstances, and aims to provide a pressure measurement device mountable to an injection molding machine and capable of performing pressure measurement more simply by configuring it such that the die to be used may be selectively selected from multiple dies with different specifications. Additional objects and advantages of the disclosure will be set forth in the description that follows.

Solution to Problem

According to the disclosure, a pressure measurement device mountable to an injection unit that injects molding material of an injection molding machine is provided. The pressure measurement device includes: a measurement cylinder mounted to the injection unit and through which the molding material injected by the injection unit flows; multiple dies mounted to the measurement cylinder and through which the molding material flows, and having different specifications; a flow path switching pin that selectively switches a discharge destination of the molding material to any one of the multiple dies; and a pressure sensor that measures a pressure of the molding material in the measurement cylinder.

Effects

The pressure measurement device according to the disclosure may be mounted to an injection molding machine, and is configured such that a die to be used may be selectively selected from multiple dies with different specifications by a flow path switching pin. This makes it possible to easily perform die switching operations even when die switching is necessary. Consequently, it is possible to perform pressure measurement more easily.

DESCRIPTION OF THE EMBODIMENTS

The following describes embodiments of the disclosure with reference to the drawings. In each drawing, some components may be omitted for purposes such as improving visibility. Various modifications described below may be implemented in any combination.

The injection molding machine of this embodiment includes an injection unit 1 for injecting molding material, an unillustrated mold clamping unit for opening and closing an unillustrated mold and performing mold clamping, and a control device 7 for controlling the injection unit 1 and the mold clamping unit. When performing injection molding, the injection unit 1 plasticizes the molding material, meters a predetermined amount, and then injects it from an injection nozzle 46. The mold clamping unit is configured to hold the mold and to open and close the mold and perform mold clamping. During injection molding, when the molding material is injected, the mold clamping unit closes the mold and applies a predetermined pressure of mold clamping force to the mold. After the molding material injected from the injection nozzle 46 into the cavity of the mold is cooled and becomes a molded product, the mold clamping unit opens the mold to discharge the molded product and then closes the mold again. As the mold clamping unit, known configurations such as direct pressure type or toggle type can be adopted.

In this specification, materials that may be injected by an injection molding machine are broadly referred to as molding materials, including not only materials mainly composed of resin but also MIM materials in which resin is added as a binder to metal powder, and CIM materials in which resin is added as a binder to ceramic powder. Although an injection molding machine using thermoplastic molding material will be described below as an example, the disclosure is also applicable to an injection molding machine using thermosetting molding material. Thermosetting molding materials include LEVI materials which are thermosetting liquid materials.

Figure 1:
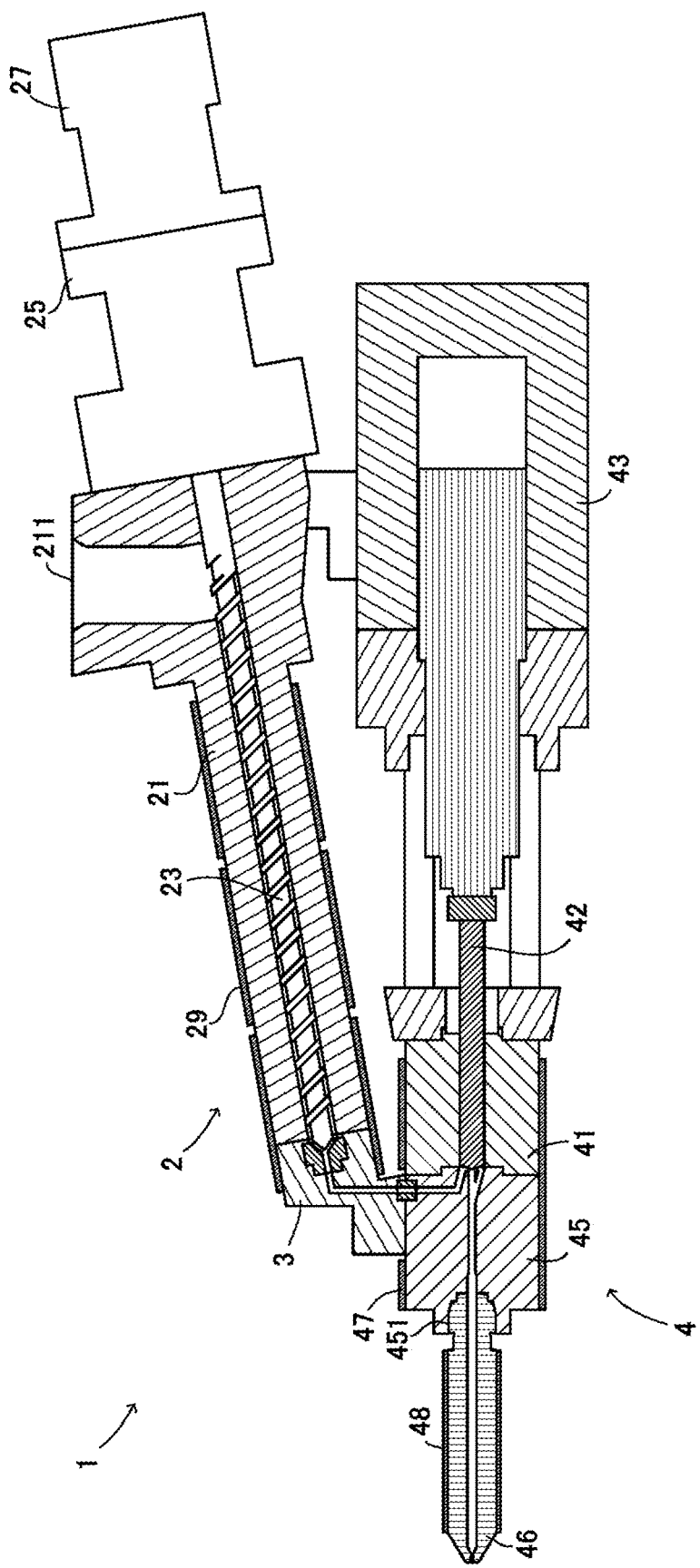
FIG. 1 is a schematic configuration diagram of an injection molding machine according to an embodiment of the disclosure, with an injection nozzle mounted.

The injection molding machine of this embodiment is a so-called screw preplasticization type injection molding machine in which a plasticizing device 2 and an injection device 4 are separately configured. As shown in FIG. 1, the injection unit 1 includes the plasticizing device 2, a junction 3, and the injection device 4. In FIG. 1, a part of the configuration is shown in cross section. In the following description, the left side in FIG. 1, that is, the side where the molding material is injected, is referred to as the front side. Also, the right side in FIG. 1, that is, the side where the molding material is supplied, is referred to as the rear side.

The plasticizing device 2 includes a plasticizing cylinder 21, a plasticizing screw 23, a check valve 25, a plasticizing screw driving device 27, and a heater 29. The plasticizing cylinder 21 is a hollow cylindrical body heated to a predetermined temperature by the heater 29 such as the band heater. A material inlet 211, through which molding material is supplied, is formed at the rear end of the plasticizing cylinder 21. The plasticizing screw 23 is rotatably provided inside the plasticizing cylinder 21. The plasticizing screw 23 sends the molding material supplied into the plasticizing cylinder 21 from the material inlet 211 forward while melting it with the heat from the heater 29 and shear heat. The check valve 25 is any actuator that advances the plasticizing screw 23, such as a fluid pressure cylinder or an electric cylinder. The check valve 25 blocks the flow path by advancing the plasticizing screw 23 upon completion of metering, preventing backflow of the molding material during injection. The plasticizing screw driving device 27 is any actuator that rotates the plasticizing screw 23, such as a hydraulic motor or an electric motor.

The junction 3 connects the plasticizing device 2 and the injection device 4. The junction 3 may be heated to a predetermined temperature by a heater.

The injection device 4 includes an injection cylinder 41, a plunger 42, a plunger driving device 43, an encoder 44, a nozzle cylinder 45, the injection nozzle 46, and heaters 47 and 48.

The injection cylinder 41 is a hollow cylindrical body heated to a predetermined temperature by the heater 47 such as a band heater. The plunger 42 is a substantially columnar member that s provided in the injection cylinder 41 so as to be able to move back and forth. The plunger driving device 43 is an arbitrary actuator that retreats the plunger 42 back and forth, for example, hydraulic cylinder or electric cylinder. The encoder 44 is a sensor that reads the position of the plunger 42. The injection speed, which is the movement speed of the plunger 42, may be calculated from the positional information of the plunger 42 read by the encoder 44 and a timer (not shown).

The nozzle cylinder 45 is a cylindrical body that is mounted to the front of the injection cylinder 41 and is heated to a predetermined temperature by the heater 47 such as a band heater. The nozzle cylinder 45 has a supply flow path that connects the junction 3 and the injection cylinder 41, and a discharge flow path that connects the injection cylinder 41 and the injection nozzle 46. In the front surface of the nozzle cylinder 45, a nozzle mounting hole 451 to which the injection nozzle 46 may be mounted is formed. More specifically, an inner wall of the nozzle mounting hole 451 is formed with female screws that are screwed with male screws formed at the rear end of the injection nozzle 46. The injection nozzle 46 is mounted to the nozzle cylinder 45 during injection molding. The injection nozzle 46 is heated to the predetermined temperature by the heater 48 such as a coil heater.

The molding material melted by the plasticizing device 2 is sent to the injection cylinder 41 through the junction 3 and the nozzle cylinder 45. In the injection cylinder 41, the molding material is stored in front of the plunger 42, and a desired amount of molding material is metered. After metering, the backflow to the plasticizing device 2 is prevented by the check valve 25, and when the plunger 42 is advanced, the molding material is sent to the injection nozzle 46 via the nozzle cylinder 45. In this way, the molding material is injected from the injection nozzle 46.

Figure 2:
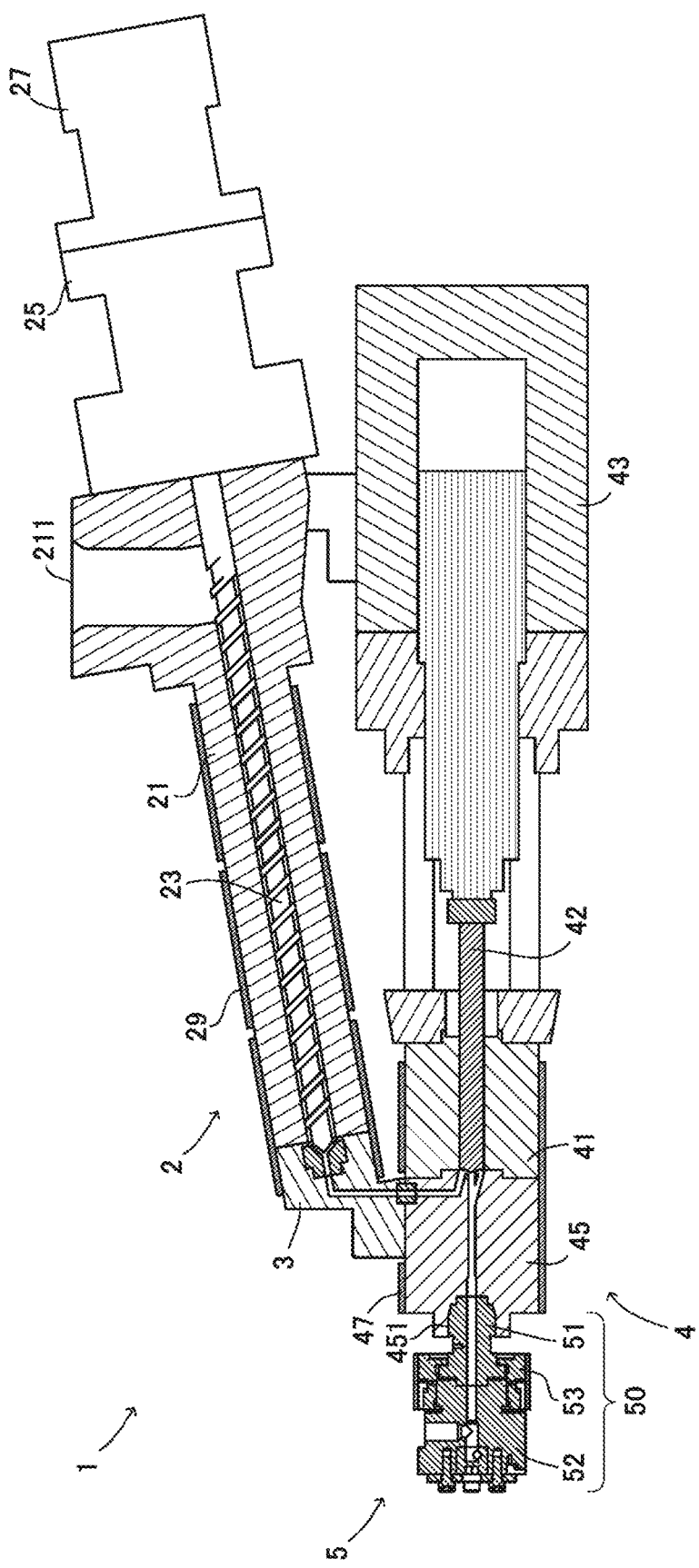
FIG. 2 is a schematic configuration diagram of an injection molding machine according to an embodiment of the disclosure, with a pressure measurement device mounted.
Figure 3:
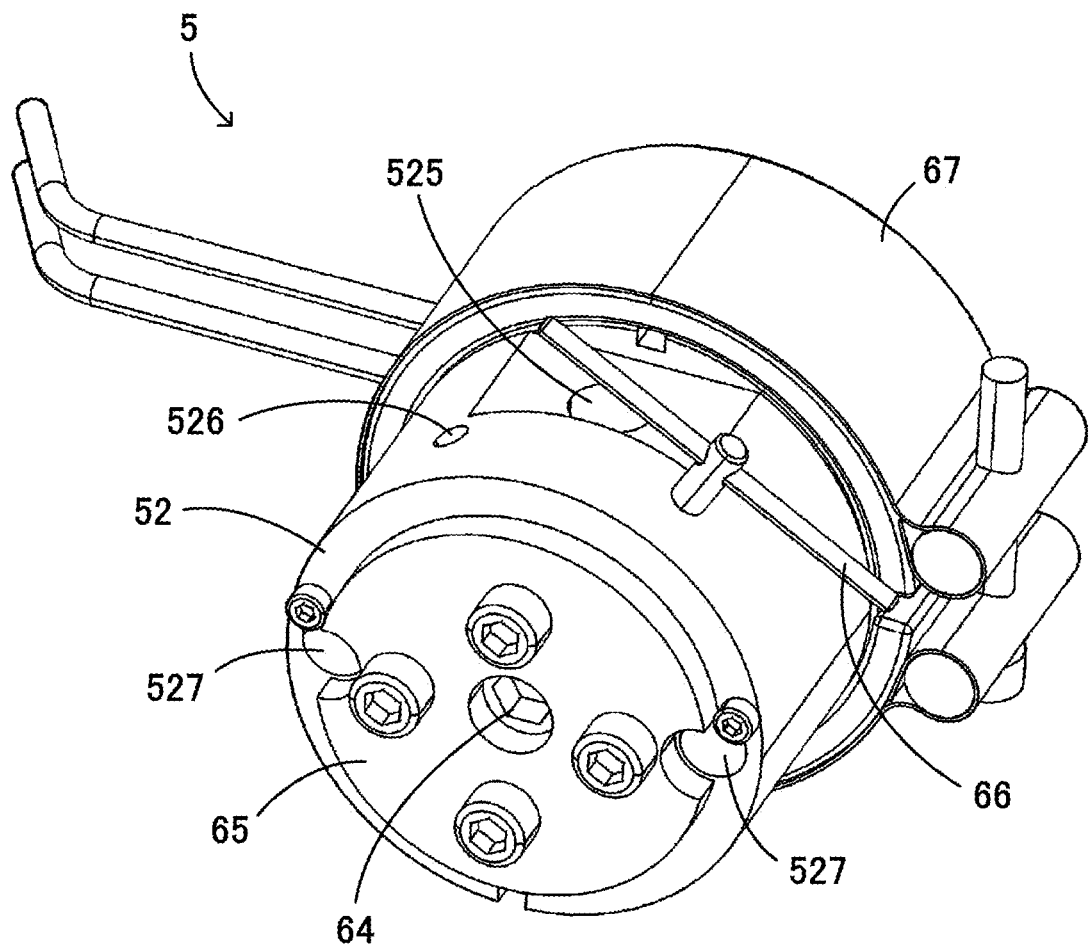
FIG. 3 is a perspective view looking down at the pressure measurement device.
Figure 4:
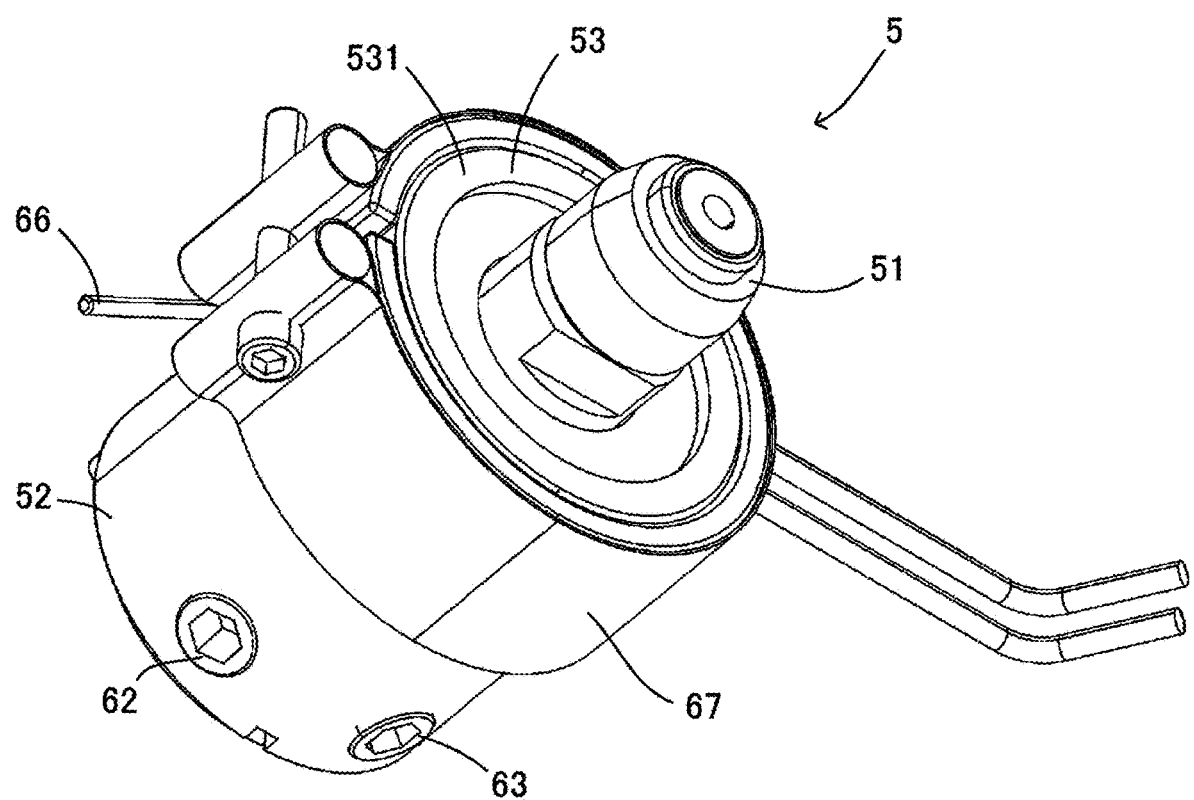
FIG. 4 is a perspective view looking up at the pressure measurement device.
Figure 5:
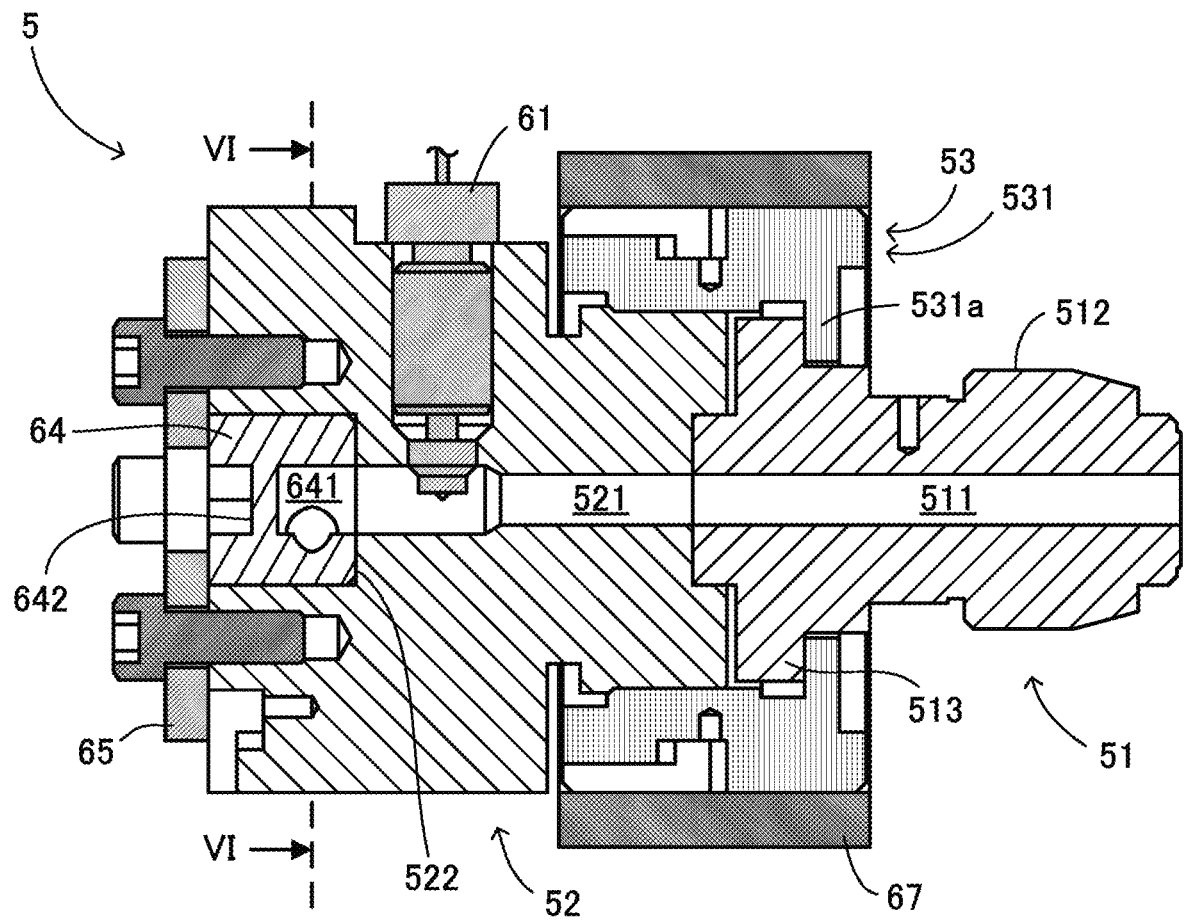
FIG. 5 is a side sectional view of the pressure measurement device.
Figure 6:
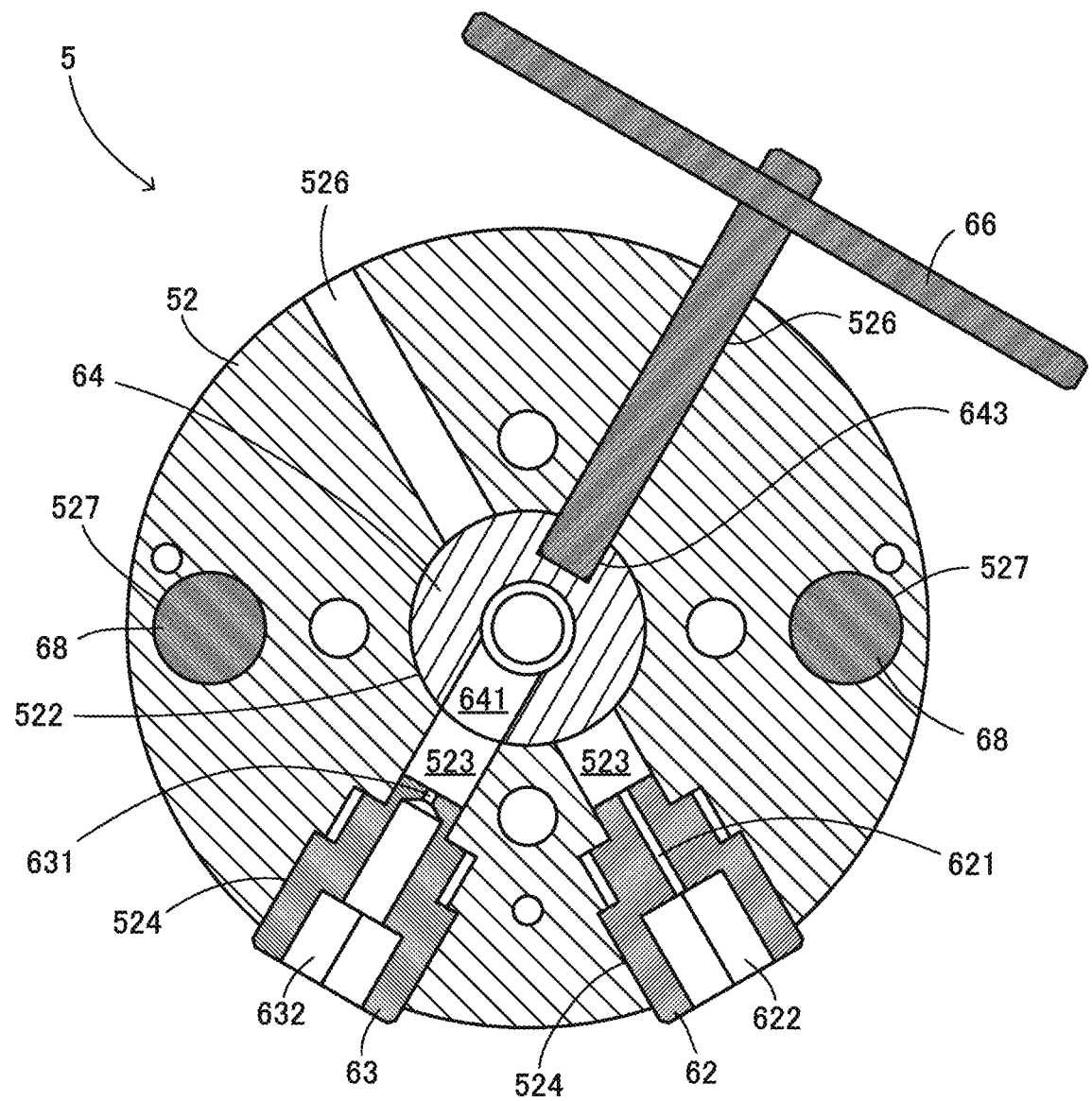
FIG. 6 is a VI-VI arrow view of the pressure measurement device, which is a front sectional view.

Here, a pressure measurement device 5 of this embodiment will be described. The pressure measurement device 5 is mounted to the injection unit 1 when performing pressure measurement for the viscosity measurement of the molding material. The mounting position of the pressure measurement device 5 is only required to be in front of the injection cylinder 41, but from a workability point of view, it is preferable to be mounted in place of the injection nozzle 46 as shown in FIG. 2. That is, it suffices to remove the injection nozzle 46 from the nozzle cylinder 45 and mount a measurement cylinder 50 of the pressure measurement device 5 to the nozzle mounting hole 451 of the nozzle cylinder 45. Details of how to mount the pressure measurement device 5 will be described later.

As shown in FIGS. 3 to 6, the pressure measurement device 5 of this embodiment includes the measurement cylinder 50, a pressure sensor 61, a first capillary die 62, a second capillary die 63, a flow path switching pin 64, a fixing plate 65, a positioning rod 66, and heaters 67 and 68.

The measurement cylinder 50 is mounted to the injection unit 1, through which the molded material injected by the injection unit 1 flows. The measurement cylinder 50 of this embodiment includes a first cylinder 51 and a second cylinder 52, and the first cylinder 51 and the second cylinder 52 are configured to be separable. The first cylinder 51 and the second cylinder 52 are fastened by a fastener 53. For example, the fastener 53 of this embodiment is composed of a cover nut 531. The first cylinder 51 and the second cylinder 52 are fastened by the cover nut 531. The heater 67 that is a band heater is wound around the cover nut 531.

The first cylinder 51 has a flow path 511, a mounting part 512, and a flange 513. The flow path 511 is formed by penetrating axially inside the first cylinder 51, and is connected to the discharge flow path of the nozzle cylinder 45. The mounting part 512 is provided at the rear end of the first cylinder 51, and has male screws that are screwed with female screws formed in the nozzle mounting hole 451. The flange 513 is provided at the front end of the first cylinder 51 and abuts the cover nut 531.

The second cylinder 52 has a flow path 521, a flow path switching pin mounting hole 522, flow paths 523, die mounting holes 524, a pressure sensor mounting hole 525, positioning rod insertion holes 526, and a heater mounting hole 527. Also, at the rear end of the second cylinder 52, male screws that are screwed with female screws formed in an inner hole of the cover nut 531 are formed.

The flow path 521 is formed axially inside the second cylinder 52 and is connected to the flow path 511 and the flow path switching pin mounting hole 522. The flow path switching pin mounting hole 522 is a hole formed on the front surface of the second cylinder 52. The flow path switching pin 64 is rotatably inserted into the flow path switching pin mounting hole 522. The flow path 523 are formed radially inside the second cylinder 52 and are connected to the flow path switching pin mounting hole 522 and the die mounting holes 524. The die mounting holes 524 are holes formed on the side surface of the second cylinder 52. The first capillary die 62 and the second capillary die 63 are fixed in the die mounting holes 524, respectively. In this embodiment, female screws are formed on the inner wall of the die mounting holes 524 and male screws are formed on the outer periphery of the first capillary die 62 and the second capillary die 63, respectively, such that they may be easily attached and detached by being screwed with each other. The pressure sensor mounting hole 525 is a hole formed through the side surface of the second cylinder 52 and the flow path 521. The pressure sensor 61 is mounted in the pressure sensor mounting hole 525. The positioning rod insertion holes 526 are holes formed through the side surface of the second cylinder 52 and the flow path switching pin mounting hole 522. The positioning rod 66 is inserted into the positioning rod insertion hole 526. The heater mounting hole 527 is a hole formed in the second cylinder 52, through which the heater 68, which is a cartridge heater, is inserted.

The flow path 523, the die mounting hole 524, and the positioning rod insertion hole 526 are provided in multiple numbers according to the number of dies. In this embodiment, two flow paths 523, die mounting holes 524, and positioning rod insertion holes 526 are each provided. However, it may be configured to be able to mount three or more dies. Multiple dies may be arranged on the same plane perpendicular to the central axis of the second cylinder 52 as shown in this embodiment in FIG. 6.

The pressure sensor 61 is a pressure transducer that measures the pressure of the molding material inside the measurement cylinder 50. The measurement position of the pressure sensor 61 is only required to be positioned upstream of the first capillary die 62 and the second capillary die 63, but it is preferable to be close to the first capillary die 62 and the second capillary die 63. In this embodiment, the pressure sensor 61 is fixed to the pressure sensor mounting hole 525 and measures the pressure of the molding material flowing through the flow path 521 of the second cylinder 52. In this embodiment, the detected pressure value is sent to the control device 7, and the control device 7 calculates the viscosity. However, a displayer may be provided to display the detected pressure value, and the measurer may read the displayed detected value to calculate the viscosity.

Figure 7:
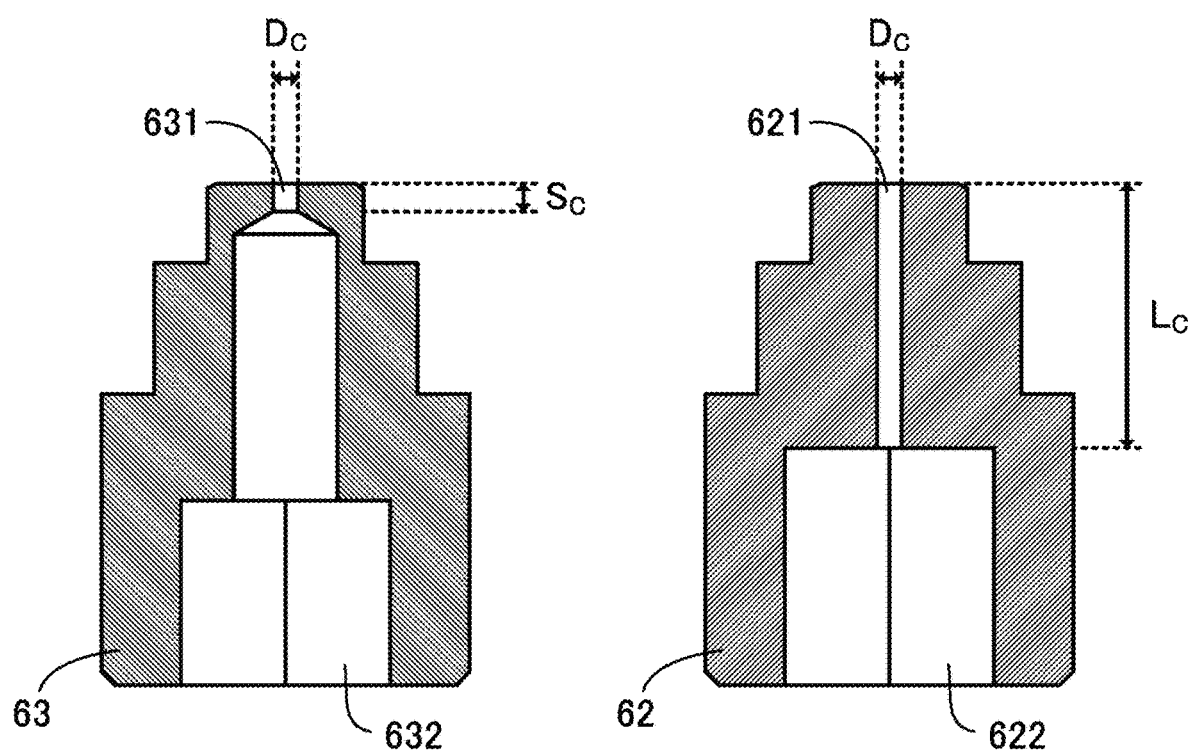
FIG. 7 is a sectional view of a first capillary die and a second capillary die.

In this embodiment, the first capillary die 62 and the second capillary die 63, which are dies with different specifications through which the molding material flows, are mounted to the measurement cylinder 50. As shown in FIG. 7, a first capillary 621, which is a cylindrical cross-sectional pore having a predetermined inflow angle, diameter, and effective length, is formed in the first capillary die 62. Also, in the second capillary die 63, a second capillary 631 having an inflow angle and diameter identical to those of the first capillary 621 and an effective length shorter than that of the first capillary 621 is formed. The molding material sent via the flow path switching pin 64 flows through the first capillary 621 and the second capillary 631. Here, "inflow angle" refers to the taper angle of a taper part that may be formed at the pore entrance. If no taper part is provided as in the first capillary die 62 and the second capillary die 63 of this embodiment, the inflow angle is treated as 180 degrees. The flow paths other than the first capillary 621 and the second capillary 631 in the first capillary die 62 and the second capillary die 63 are only required to have a flow path length at which pressure loss can be ignored. Also, at the outlet of flow path in the first capillary die 62 and the second capillary die 63, tool holes 622 and 632 that fit tools of any shape may be formed respectively. In this embodiment, hexagonal holes that fit a hex wrench are formed as the tool holes 622 and 632. This makes it easy to mount the first capillary die 62 and the second capillary die 63 to the die mounting holes 524.

The flow path switching pin 64 selectively chooses the die to be used from multiple dies, in this embodiment, from the first capillary die 62 and the second capillary die 63. In other words, the discharge destination of the molding material supplied from the flow path 511 and the flow path 521 is selectively switched to any one of the multiple dies. The flow path switching pin 64 in this embodiment is a cylindrical member rotatably inserted into the flow path switching pin mounting hole 522, and has a flow path 641, a tool hole 642, and a recess 643. The flow path 641 is bent by 90° at an intermediate part, with its inlet side connected to the flow path 521 and its outlet side connected to one of the flow paths 523. By rotating the flow path switching pin 64, the flow paths 523 connected to the flow path 641 may be switched, and the die to be used may be selected. The tool hole 642 is a hole formed on the front surface of the flow path switching pin 64 to be fitted with a tool of any shape. In this embodiment, a hexagonal hole that fits with a hex wrench is formed as the tool hole 642. By fitting a tool into the tool hole 642, the flow path switching pin 64 may be rotated. The recess 643 is a hole formed on the side surface of the flow path switching pin 64 and is provided at a position where it connects with one of the positioning rod insertion holes 526 when the flow path 641 is connected with one of the flow paths 523. That is, in this embodiment, the flow path switching pin 64 is provided on the central axis of the second cylinder 52, and when the outlet side of the flow path 641 and one of the flow paths 523 are connected, the recess 643 and the positioning rod insertion hole 526 are positioned on opposite sides across the central axis.

The fixing plate 65 is a plate-like member fixed to the front surface of the second cylinder 52 by a bolt or the like, and abuts on the flow path switching pin 64 so as to prevent the fall of the flow path switching pin 64. An opening is formed in the central part of the fixing plate 65 so as not to cover the tool hole 642.

The positioning rod 66 has a rod-shaped member inserted into the positioning rod insertion hole 526. After selecting which die to be used by rotating the flow path switching pin 64, the positioning rod 66 is inserted into the positioning rod insertion hole 526. As a result, the tip of the positioning rod 66 fits into the recess 643, accurately positioning the flow path switching pin 64 and preventing unexpected rotation.

Although in this embodiment, the flow path switching pin 64 is configured to be manually rotatable using a tool, it may also be configured to rotate automatically by any actuator such as fluid pressure cylinder or electric motor. At this time, the switching of the die by the flow path switching pin 64 may be controlled by the control device 7.

With the above-mentioned pressure measurement device 5, the pressure of the melted molding material is measured. In the state where the pressure measurement device 5 is mounted to the injection unit 1, melting, metering, and injection of the molding material are performed in the same manner as during injection molding. The molding material pushed out by the plunger 42 passes through the nozzle cylinder 45, sequentially through the flow path 511, the flow path 521, the flow path 641, and flow path 523, and is discharged from one of multiple dies selected by the flow path switching pin 64. At this time, the pressure sensor 61 measures the pressure of the molding material flowing through the flow path 521. With the pressure measurement device 5 like this embodiment, it is easy to switch the die to be used by the flow path switching pin 64, thus workability is improved.

To prevent the molded material discharged from the first capillary die 62 or the second capillary die 63 from scattering, the measurement cylinder 50 is preferably mounted to the injection unit 1 with the first capillary die 62 or the second capillary die 63, namely the die mounting holes 524 facing downward. The measurement cylinder 50 is specifically mounted by the following procedure. First, the cover nut 531 is inserted into the first cylinder 51, and the mounting part 512 of the first cylinder 51 is screwed with the nozzle mounting hole of the nozzle cylinder 45. Next, the first cylinder 51 and the second cylinder 52 are screwed, and positioned with the die mounting holes 524 of the second cylinder 52 facing downward. In this state, the cover nut 531 is screwed into the second cylinder 52, and the cover nut 531 is rotated until a wall surface 531a of the cover nut 531 abuts the flange 513 of the first cylinder 51. In this way, the first cylinder 51 and the second cylinder 52 are fastened.

Each member mounted to the second cylinder 52 may be mounted before fastening the first cylinder 51 to the second cylinder 52 or mounted after fastening. In this embodiment, the first cylinder 51 and the second cylinder 52 are fastened by the cover nut 531, but other fasteners 53 such as a bolt may also be used.

After the fastening of the first cylinder 51 and the second cylinder 52 in the above procedure is completed, when the first cylinder 51 is screwed with the nozzle mounting hole 451, position alignment is performed with the die mounting holes 524 facing downward. Thus, if the first cylinder 51 and the second cylinder 52 are fastened by the above procedure, they may be mounted to the nozzle cylinder 45 in the assembled state thereafter. However, if the injection molding machine to be installed is changed, it is necessary to perform the position alignment again using the same procedure.

In order to ensure that all the die mounting holes 524 face downward, it is necessary that the die mounting holes 524 are formed on one side surface of the second cylinder 52. In a front view, the angle formed by a vertical line passing through the central axis of the second cylinder 52 and a straight line passing through the center of the die mounting hole 524 is preferably 40 degrees or less. The vertical line passing through the central axis of the second cylinder 52 is a straight line indicating the direction of gravity.

Here, the control device 7 of this embodiment will be described. The control device 7 controls the injection unit 1 and the mold clamping unit, and calculates the viscosity based on pressure values of the molding material measured by the pressure measurement device 5.

Figure 8:
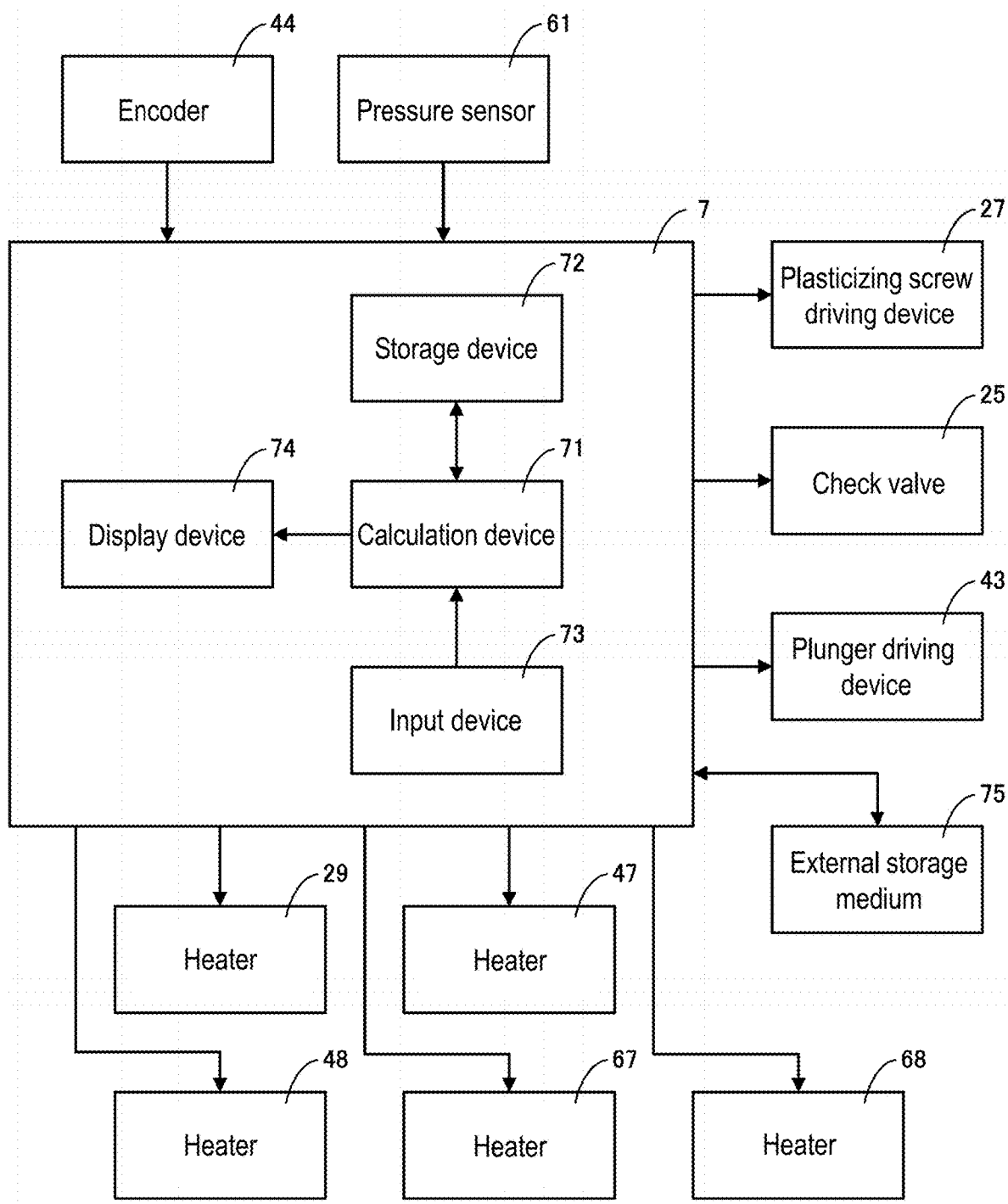
FIG. 8 is a block diagram of a control device.

The control device 7 may be configured by freely combining hardware and software, and as shown in FIG. 8 for example, it includes a calculation device 71, a storage device 72, an input device 73, and a display device 74. The calculation device 71 is any calculation circuit such as a CPU, and performs various calculations for controlling each device as well as calculations related to viscosity measurement. The storage device 72 may be composed of RAM, ROM and auxiliary storage devices combined at will, and stores data necessary for calculations by the calculation device 71. The input device 73 and the display device 74 may each be standalone devices or devices that serve both functions like a touch panel. In this embodiment, an operation panel equipped with a touch panel and input keys is provided as the input device 73 and the display device 74.

During injection molding and viscosity measurement, the control device 7 controls the plasticizing screw driving device 27, the check valve 25, and the plunger driving device 43 of the injection unit 1 to perform melting, metering, and injection of the molding material.

The control device 7 controls the heaters 29, 47, 48, 67, 68, and heats the plasticizing cylinder 21, the injection cylinder 41, the nozzle cylinder 45, the injection nozzle 46, and the measurement cylinder 50 to the desired temperature. However, the heaters 67, 68 are not used during injection molding. Moreover, the heater 48 is not used during viscosity measurement. The heaters 29, 47, 48, 67, and 68 have a temperature sensor such as a thermocouple, and the heaters 29, 47, 48, 67, and 68 may be controlled by feedback based on the measured temperature.

The control device 7 calculates the viscosity based on the pressure of the molding material measured by the pressure sensor 61 of the pressure measurement device 5. The control device 7 may perform Bagley correction when calculating the viscosity. Bagley correction is a correction that takes into account the pressure loss occurred at the pore entrance and pore exit of the die so as to obtain a true shear stress. When performing Bagley correction, two pressure measurements are required for one viscosity calculation, so it is necessary to switch dies. Thus, it may also be configured that the measurer can freely switch whether or not to perform Bagley correction; Bagley correction is performed when it is desirable to detect the viscosity more accurately, and Bagley correction is not performed when simple measurement is sufficient. Further, the control device 7 may perform Rabinowitsch correction when calculating the viscosity. Rabinowitsch correction is a correction that takes into account the non-Newtonian nature of the molding material which is a fluid so as to obtain the true shear rate. Rabinowitsch correction may always be performed, or it may be configured such that the measurer may freely switch whether or not to perform Rabinowitsch correction. If priority is given to making calculations easier, it is not necessary to perform Rabinowitsch correction.

In calculating viscosity, the pressure value of the molding material in the measurement cylinder 50 is used. Although the detected pressure value may fluctuate during injection of the molding material, a detected value when the detected value becomes nearly flat may be used as a detected pressure. Alternatively, an average value of detected values in the latter half of injection when it is presumed that pressure has become nearly flat may be used as a detected pressure. Also, in calculating viscosity, an injection speed value is used. The injection speed used for calculation may be a set value, or a measured value calculated based on the encoder 44, but a more accurate viscosity calculation can be performed using a measured value. In case of a measured value, a value at which injection speed has become nearly flat may be used, or an average injection speed in the latter half of injection may be used.

Figure 9:
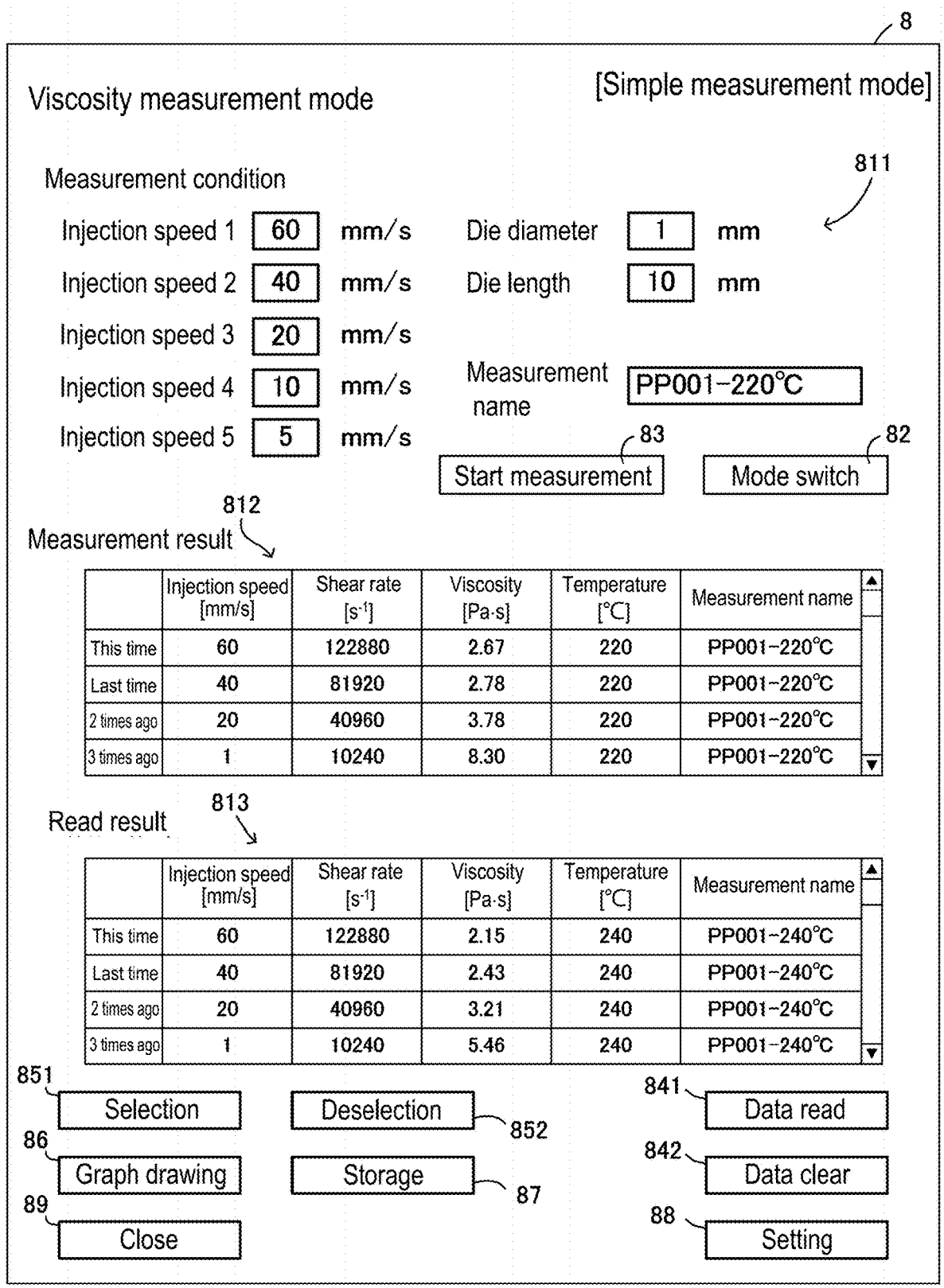
FIG. 9 is an example of GUI for viscosity measurement during "Simple Measurement Mode".
Figure 10:
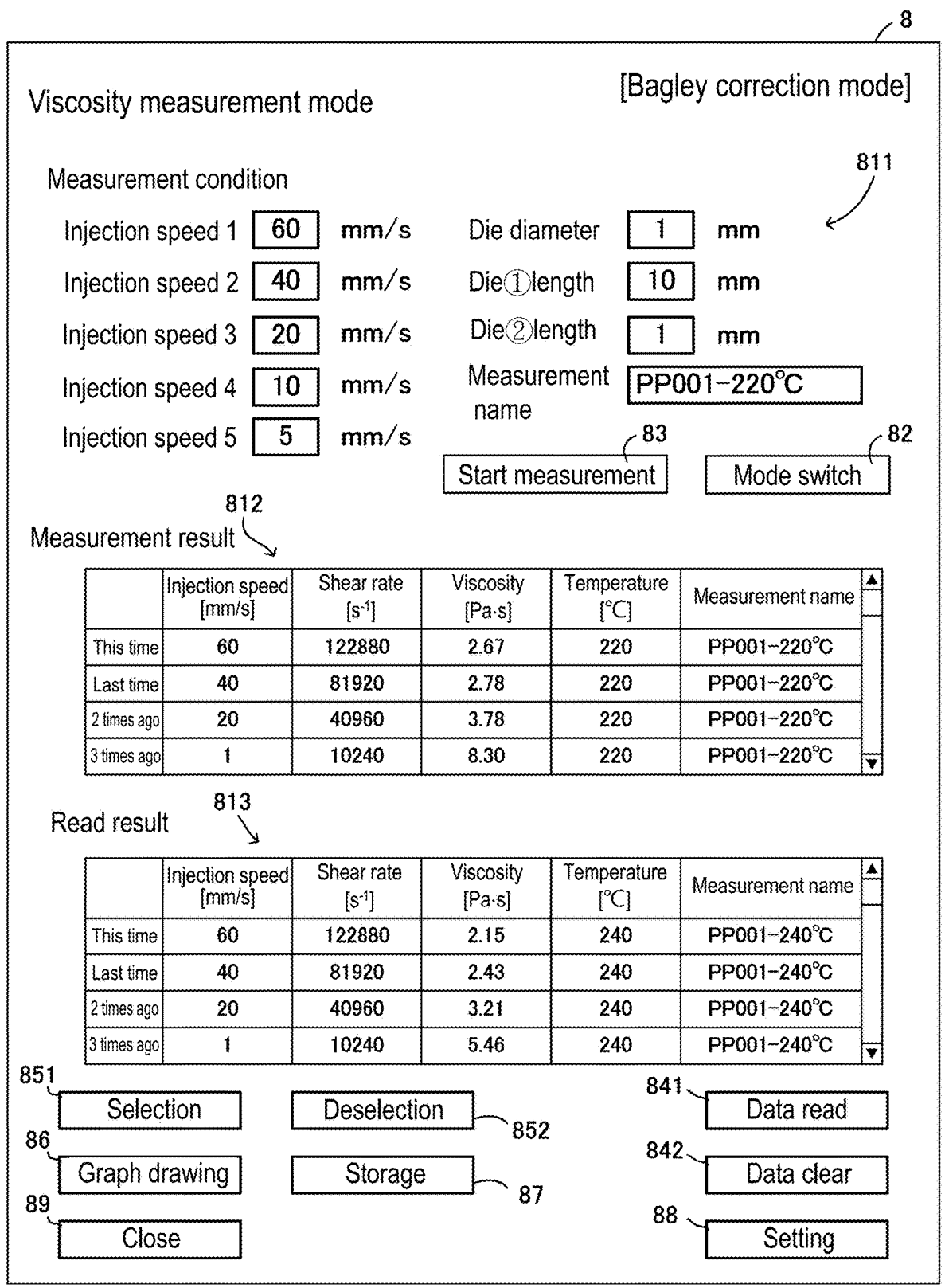
FIG. 10 is an example of GUI for viscosity measurement during "Bagley Correction Mode".

FIGS. 9 and 10 show an example of a GUI 8 for viscosity measurement displayed on the display device 74. The GUI 8 for viscosity measurement may be moved from a normal GUI for injection molding. The GUI 8 includes, for example, a measurement condition input form 811, a measurement result display table 812, a read result display table 813, a mode switching button 82, a measurement start button 83, a data read button 841, a data clear button 842, a selection button 851, a deselection button 852, a graph drawing button 86, a storage button 87, a setting button 88, and a close button 89.

The measurement condition input form 811 has input fields for data necessary for viscosity calculation and set values related to viscosity measurement. Specifically, the measurer inputs the specifications of the die (in the case of a capillary die, the diameter and effective length of the capillary), the set value of the injection speed, and a freely settable measurement name via the input device 73. In this embodiment, it is possible to input multiple values for the injection speed. When multiple injection speeds are input, the control device 7 performs multiple viscosity measurements by changing the injection speed in a predetermined order.

In this embodiment, although the heater temperature is set in normal GUI for injection molding, an input field related to the heater temperature may be provided in the measurement condition input form 811. The heater temperatures related to the heaters 29, 47, 67, and 68 are usually set to the same temperature. It is desirable that the temperature of each part is stable when measuring viscosity. For example, after moving from the GUI for injection molding to the GUI 8 for viscosity measurement, a restriction may be set such that viscosity measurement cannot be started until a freely set waiting time for temperature rise has elapsed, so as to ensure temperature stability.

When the mode switching button 82 is pressed, whether or not to perform Bagley correction may be switched. Specifically, by using the mode switch button 82, it is possible to switch between "simple measurement mode", which does not perform Bagley correction, and "Bagley correction mode", which does perform Bagley correction. As mentioned above, when it is configured such that Rabinowitsch correction may be performed, it may also be configured that whether or not to perform Rabinowitsch correction is selectable.

When the measurement start button 83 is pressed, based on the input data and set values, the molding material is injected from the pressure measurement device 5 and viscosity measurement of the melted molding material is performed. As mentioned above, when multiple injection speeds are input, multiple measurements are performed consecutively. Also, if "Bagley correction mode" is selected, after measurement using one die (for example, first capillary die 62) is completed, a message prompting die switching is displayed. The measurer switches to another die (for example second capillary die 63) by operating the flow path switching pin 64 and inputs completion of die switching to the control device 7. Upon receiving this, a measurement using the second capillary die 63 at the same injection speed is performed. However, as mentioned earlier, die switching by the flow path switching pin 64 may be performed automatically by controlling an actuator by the control device 7. At this time, manual operation related to die switching by the measurer during measurement is not necessary, which makes viscosity measurement more efficient.

In this embodiment, during viscosity measurement, the metered value is maximum measurable value in the injection unit 1. That is, metering of the molding material continues until the plunger 42 reaches its retraction limit. However, the measurable value may be other values within a range in which stable measurements may be performed, or may be configured to be freely settable.

The measurement result display table 812 lists data obtained by the current viscosity measurement for each measurement. Also, the read result display table 813 lists data obtained from past viscosity measurements for each measurement. When the data read button 841 is pressed, the data related to the measurement results stored in an auxiliary storage device of the storage device 72 or an external storage medium 75 such as a flash memory is referred to and displayed on the read result display table 813. When the data clear button 842 is pressed, the data displayed on the measurement result display table 812 and the read result display table 813 are reset. The data displayed on the measurement result display table 812 and the read result display table 813 may be part of the data related to the measurement results. The data displayed on the measurement result display table 812 and the read result display table 813 may include data such as injection speed, shear rate, detected pressure, viscosity, temperature, and measurement name. The data to be displayed may be freely selected by the measurer. By comparing the data of the measurement result display table 812 and the read result display table 813, it becomes easy for the measurer to grasp the characteristics of the molding material. The injection speed and temperature included in the data of measurement result may be set values, measured values, or both. In particular, when it is expected that the measured value will be almost identical to the set value, it is acceptable to store only the set value as the data.

By tapping operation or the like by a measurer, one or more rows of data displayed on the measurement result display table 812 or the read result display table 813 are tentatively selected. In this state, when the selection button 851 is pressed, the tentatively selected row is selected. Alternatively, it may be configured such that a row may be directly selected by tapping operation or the like by a measurer without going through tentative selection. In this case, the selection button 851 may be omitted. When the deselection button 852 is pressed, row selection is reset. Here, when the graph drawing button 86 is pressed, based on the data of selected rows, a graph is displayed on the display device 74. That is to say, the control device 7 is configured to draw graphs based on data obtained from viscosity calculation. The graph displayed may be a so-called flow curve; that is to say, a logarithmic graph with shear rate on the x-axis and viscosity on the y-axis. By configuring the graph displayable, characteristics of molding material may be visually understood. Graph data may also be saved as image data in an auxiliary storage device of the storage device 72 or the external storage medium 75 such as flash memory.

When the storage button 87 is pressed, data related to the measurement results is output in any format such as CSV, and stored in the auxiliary storage device of the storage device 72 or the external storage medium 75 such as a flash memory. The output data may include data of die specifications (in case of capillary die, diameter and effective length of capillary), injection speed, shear rate, detected pressure, viscosity, temperature, and measurement name for each measurement. If a correction has been performed, the data may include both the viscosity before the correction and the viscosity after the correction.

When the setting button 88 is pressed, a predetermined setting screen is displayed. In this embodiment, setting information that does not need to be changed for each viscosity measurement is displayed on a setting screen separate from the measurement condition input form 811. On the setting screen, for example, the diameter of the plunger 42, the minimum and maximum injection speeds that may be set during viscosity measurement, and the waiting time for temperature rise may be set. These settings may also require authentication such as a password to change. Also, the diameter of the plunger 42 may refer to the data set by the model of the injection molding machine, and in this case, the input field related to diameter of the plunger 42 may be omitted.

When the close button 89 is pressed, the GUI 8 for viscosity measurement is closed and moves to normal GUI for injection molding.

Below is a specific description of how the control device 7 calculates viscosity based on the pressure of molten molding material. Here, $\eta_{ap}$ [Pa·s]: Apparent viscosity
$\eta$ [Pa·s]: True viscosity
$\tau_{ap}$ [Pa]: Apparent shear stress
$\tau$ [Pa]: True shear stress
$\gamma_{ap}$ [s-1]: Apparent shear rate
$\gamma$ [s-1]: True shear rate
$P_L$ [Pa]: Detected pressure when using first capillary die 62
$P_S$ [Pa]: Detected pressure when using second capillary die 63
$P_0$ [Pa]: Estimated pressure when effective length is 0 mm $D_C$ [mm]: Diameter of first capillary 621 and second capillary 631
$L_C$ [mm]: Effective length of first capillary 621
$S_C$ [mm]: Effective length of second capillary 631
Q [mm$^3$/s]: Volumetric flow rate
$D_P$ [mm]: Diameter of plunger 42
V [mm/s]: Injection speed
n: Structural viscosity index The apparent viscosity $\eta_{ap}$ is a value obtained by dividing the apparent shear stress $\tau_{ap}$ by the apparent shear rate $\gamma_{ap}$ as shown in the following formula.

$$\eta_{ap} = \frac{\tau_{ap}}{\gamma_{ap}} \qquad \text{[Formula 1]}$$

Here, the apparent shear stress $\tau_{ap}$ may be obtained by the following formula. If Bagley correction is not performed, when calculating the apparent shear stress $\tau_{ap}$, either the first capillary die 62 or the second capillary die 63 may be used, but using the first capillary die 62 results in smaller measurement errors. The following formula is a calculation formula when using the first capillary die 62, and when using the second capillary die 63, the detected pressure $P_S$ and the effective length $S_C$ are used instead of detected pressure $P_L$ and the effective length $L_C$.

$$\tau_{ap} = \frac{P_L D_C}{4 L_C} \qquad \text{[Formula 2]}$$

Also, the apparent shear rate $\gamma_{ap}$ may be obtained by the following formula.

$$\begin{aligned}\gamma_{ap} &= \frac{32Q}{\pi D_C^3} \\ &= \frac{32}{\pi D_C^3} \times \pi \left(\frac{D_P}{2}\right)^2 V \\ &= \frac{8 D_P^2 V}{D_C^3}\end{aligned} \qquad \text{[Formula 3]}$$

With the above calculation formulae, the apparent viscosity $\eta_{ap}$ may be obtained from the apparent shear stress $\tau_{ap}$ and the apparent shear rate $\gamma_{ap}$. For simple viscosity measurements, it is sufficient to obtain the apparent viscosity $\eta_{ap}$ using these calculation formulae. For more accurate viscosity measurements, at least one of Bagley correction and Rabinowitsch correction is performed, preferably both.

Bagley correction is a correction that takes into account the pressure loss occurred at the pore entrance and pore exit so as to obtain the true shear stress $\tau$. When the molding material passes through the pore, pressure loss occurs at the pore entrance, inside the pore, and at the pore exit. By subtracting the estimated pressure $P_0$ when an effective length of the pore (capillary) is 0 mm from the detected pressure $P_L$ when using the first capillary die 62, it is possible to estimate the pressure ($P_L$–$P_0$) during use of the first capillary die 62 when no pressure loss occurred at the pore entrance and pore exit. The true shear stress $\tau$ after Bagley correction may be obtained by the following formula.

$$\tau = \frac{(P_L - P_0)D_C}{4L_C} \quad \text{[Formula 4]}$$

Here, the estimated pressure $P_0$ may be obtained by the following formula. As is clear from this formula, when performing Bagley correction, it is necessary to switch the die to be used and perform two pressure measurements to grasp the detected pressure $P_L$ when using the first capillary die 62 and the detected pressure $P_S$ when using the second capillary die 63.

$$P_0 = \frac{P_S L_C - P_L S_C}{L_C - S_C} \quad \text{[Formula 5]}$$

The apparent shear rate $\gamma_{ap}$ is a value of shear rate when the structural viscosity index n of the molding material to be measured is 1, that is, when the molding material is a Newtonian fluid. However, in reality, since molding materials are generally non-Newtonian fluids, there will be a discrepancy between the true shear rate $\gamma$ and the apparent shear rate $\gamma_{ap}$. Rabinowitsch correction is a correction to obtain the true shear rate $\gamma$ by multiplying the apparent shear rate $\gamma_{ap}$ by a predetermined coefficient determined by the structural viscosity index n. The true shear rate $\gamma$ after Rabinowitsch correction may be obtained by the following formula.

$$\gamma = \frac{8D_P^2 V}{D_C^3} \times \frac{3n+1}{4n} \quad \text{[Formula 6]}$$

Here, the structural viscosity index n is the slope of the logarithm of the apparent shear rate $\gamma_{ap}$ and the logarithm of the true shear stress $\tau$. Thus, the structural viscosity index n may be obtained by the following formula. However, when only Rabinowitsch correction is performed without Bagley correction, the apparent shear stress $\tau_{ap}$ is used for calculation instead of the true shear stress $\tau$.

$$n = \frac{d \log_{10} \tau}{d \log_{10} \gamma_{ap}} \quad \text{[Formula 7]}$$

The true shear stress $\tau$ and the true shear rate $\gamma$ are calculated by Bagley correction and Rabinowitsch correction respectively. At this time, the true viscosity $\eta$ is a value obtained by dividing the true shear stress $\tau$ by the true shear rate $\gamma$ as shown in the following formula.

$$\eta = \frac{\tau}{\gamma} \quad \text{[Formula 8]}$$

The disclosure is not limited to the configuration of the embodiments shown in the drawings, as already several examples have been specifically shown, and various modifications or applications are possible without departing from the technical idea of the disclosure.

For example, in this embodiment, the calculation formula related to calculating viscosity when using a capillary die having a capillary which is cylindrical cross-sectional pore was described, but instead of a capillary die, a slit die with a slit which is a rectangular cross-sectional pore may be used. That is, in detecting the viscosity of the molding material, a first slit die having a first slit formed with a predetermined inflow angle, width, gap and effective length; and a second slit die having a second slit formed with an inflow angle, width and gap identical to those of the first slit and an effective length shorter than that of the first slit may be used.

When using a slit die, the apparent shear stress $\tau_{ap}$, the apparent shear rate $\gamma_{ap}$, true shear stress $\tau$ and the true shear rate $\gamma$ may be obtained by substituting for formula used when using a capillary die with following formula. Wherein, $\eta_{ap}$ [Pa·s]: Apparent viscosity
$\eta$ [Pa·s]: True viscosity
$\tau_{ap}$ [Pa]: Apparent shear stress
$\tau$ [Pa]: True shear stress
$\gamma_{ap}$ [s-1]: Apparent shear rate
$\gamma$ [s-1]: True shear rate
$P_L$ [Pa]: Detected pressure when using first slit die
$P_S$ [Pa]: Detected pressure when using second slit die
$P_0$ [Pa]: Estimated pressure when effective length is 0 mm
B [mm]: Width of slit
H [mm]: Gap of slit
$L_S$ [mm]: Effective length of first slit
$S_S$ [mm]: Effective length of second slit
$D_P$ [mm]: Diameter of plunger 42
V [mm/s]: Injection speed
n: Structural viscosity index $$\tau_{ap} = \frac{P_L H B}{2L_S (H+B)} \quad \text{[Formula 9]}$$

However, this formula is for when the first slit die is used, and when the second slit die is used, the detected pressure $P_S$ and the effective length $S_S$ are used instead of the detected pressure $P_L$ and the effective length $L_S$.

$$\gamma_{ap} = \frac{3\pi D_p^2 V}{2BH^2} \quad \text{[Formula 10]}$$

$$\tau = \frac{(P_L - P_0)HB}{2L_S(H+B)} \quad \text{[Formula 11]}$$

Wherein, $$P_0 = \frac{P_S L_S - P_L S_S}{L_S - S_S} \quad \text{[Number 12]}$$

$$\gamma = \frac{3\pi D_p^2 V}{2BH^2} \times \frac{2n+1}{3n} \quad \text{[Number 13]}$$

Wherein, $$n = \frac{d \log_{10} \tau}{d \log_{10} \gamma_{ap}} \quad \text{[Number 14]}$$

The pressure measurement device 5 of this embodiment is particularly effective in the case of switching multiple types of dies to perform viscosity measurement. In this embodiment, two types of dies with different effective lengths are mounted to the measurement cylinder 50 such that Bagley correction may be performed, but the specifications other than the effective length may also be different. In addition to Bagley correction, the following situations are conceivable as cases where a die with different specifications is exchanged for viscosity measurement. When examining the relationship between shear rate and viscosity for a certain molding material, the viscosity measurements is measured multiple times while changing the injection speed. However, in an injection molding machine, there are upper and lower limits for the injection speed, so there may be cases where the desired shear rate cannot be obtained depending on the specification of the injection molding machine. In such cases, the viscosity at the desired shear rate can be measured by switching to a die with a different diameter in the case of a capillary die, or a die with at least one of width and gap different in the case of a slit die.

The injection molding machine to which the pressure measurement device 5 may be mounted may be a so-called inline screw-type injection molding machine in which the plasticizing device and the injection device are integrated. However, if it is a screw preplasticization type injection molding machine equipped with a check valve 25 that prevents backflow by advancing the plasticizing screw 23 like the injection molding machine of this embodiment, it is superior in stability of metering and injection compared to an inline screw-type injection molding machine, thus it is possible to more accurately measure the viscosity of the molding material. The embodiment was chosen in order to explain the principles of the disclosure and its practical application. Many modifications and variations are possible in light of the above teachings. It is intended that the scope of the disclosure be defined by the claims.

What is claimed is:

1. A pressure measurement device mountable to an injection unit that injects molding material of an injection molding machine, the pressure measurement device comprising:
    a measurement cylinder mounted to the injection unit and through which the molding material injected by the injection unit flows;
    a plurality of dies mounted to the measurement cylinder and through which the molding material flows, and having different specifications;
    a flow path switching pin that selectively switches a discharge destination of the molding material to any one of the plurality of dies; and
    a pressure sensor that measures a pressure of the molding material in the measurement cylinder,
    wherein the measurement cylinder comprises:
        a first cylinder screwed with a nozzle mounting hole of the injection unit; and
        a second cylinder in which a die mounting hole to which the plurality of dies are mounted is formed on a side surface,
    wherein in a front view, an angle formed by a vertical line passing through a central axis of the second cylinder and a straight line passing through a center of the die mounting hole is 40 degrees or less.

2. The pressure measurement device according to claim 1, wherein the plurality of dies comprise:
    a first capillary die in which a first capillary having a cylindrical cross-sectional shape is formed; and
    a second capillary die in which a second capillary having a cylindrical cross-sectional shape is formed,
    wherein the first capillary has a predetermined inflow angle, diameter, and effective length, and
    the second capillary has the same inflow angle and diameter as the first capillary and has a shorter effective length than the first capillary.

3. The pressure measurement device according to claim 1, wherein the plurality of dies comprise:
    a first slit die in which a first slit having a rectangular cross-sectional shape is formed; and
    a second slit die in which a second slit having a rectangular cross-sectional shape is formed,
    wherein the first slit has a predetermined inflow angle, width, gap, and effective length, and
    the second slit has the same inflow angle, width, and gap as the first slit and has a shorter effective length than the first slit.

4. The pressure measurement device according to claim 1, comprising:
    a fastener,
    wherein the fastener fastens the first cylinder and the second cylinder.

5. The pressure measurement device according to claim 4, wherein the fastener is a cover nut that abuts a flange formed on the first cylinder and is screwed with the second cylinder.

6. The pressure measurement device according to claim 1, further comprising:
    a heater that heats the measurement cylinder to a desired temperature.

* * * * *